United States Patent
Picon Ruiz et al.

(10) Patent No.: US 12,142,033 B2
(45) Date of Patent: Nov. 12, 2024

(54) SYSTEM AND METHOD FOR IDENTIFICATION OF PLANT SPECIES

(71) Applicant: BASF SE, Ludwigshafen am Rein (DE)

(72) Inventors: Artzai Picon Ruiz, Derio (ES); Miguel Linares De La Puerta, Derio (ES); Christian Klukas, Limburgerhof (DE); Till Eggers, Ludwigshafen am Rhein (DE); Rainer Oberst, Limburgerhof (DE); Juan Manuel Contreras Gallardo, Utrera (ES); Javier Romero Rodriguez, Utrera (ES); Hikal Khairy Shohdy Gad, Limburgerhof (DE); Gerd Kraemer, Limburgerhof (DE); Jone Echazarra Huguet, Derio (ES); Ramon Navarra-Mestre, Limburgerhof (DE); Miguel Gonzalez San Emeterio, Derio (ES)

(73) Assignee: BASF SE, Ludwigshafen am Rein (DE)

( * ) Notice: Subject to any disclaimer, the term of this patent is extended or adjusted under 35 U.S.C. 154(b) by 345 days.

(21) Appl. No.: 17/640,742

(22) PCT Filed: Sep. 3, 2020

(86) PCT No.: PCT/EP2020/074600
§ 371 (c)(1),
(2) Date: Mar. 4, 2022

(87) PCT Pub. No.: WO2021/043904
PCT Pub. Date: Mar. 11, 2021

(65) Prior Publication Data
US 2022/0327815 A1    Oct. 13, 2022

(30) Foreign Application Priority Data
Sep. 5, 2019  (EP) .................................. 19195608

(51) Int. Cl.
*G06V 10/82* (2022.01)
*G06T 7/00* (2017.01)
*G06V 20/10* (2022.01)

(52) U.S. Cl.
CPC .............. *G06V 10/82* (2022.01); *G06T 7/001* (2013.01); *G06V 20/188* (2022.01); *G06T 2207/10024* (2013.01); *G06T 2207/20081* (2013.01)

(58) Field of Classification Search
CPC ...... G06V 10/82; G06V 20/188; G06T 7/001; G06T 2207/10024; G06T 2207/20081; A01M 21/00
(Continued)

(56) References Cited

U.S. PATENT DOCUMENTS 10,373,317 B1  8/2019  Kim et al.
2019/0220666 A1  7/2019  Kiepe et al.

FOREIGN PATENT DOCUMENTS

CN  109426803 A  3/2019
CN  109711448 A  5/2019
WO  2018/208947 A1  11/2018

OTHER PUBLICATIONS

International Search Report and Written Opinion for PCT/EP2020/074600 mailed Sep. 30, 2020, 14 pgs.
(Continued)

*Primary Examiner* — Charlotte M Baker
(74) *Attorney, Agent, or Firm* — Lowenstein Sandler LLP

(57) ABSTRACT

A computer-implemented method, computer program product and computer system (100) for identifying weeds in a crop field using a dual task convolutional neural network (120) having a topology with an intermediate module (121) to execute a classification task being associated with a first loss function (LF1), and with a semantic segmentation
(Continued)

module (122) to execute a segmentation task with a second different loss function (LF2). The intermediate module and the segmentation module are being trained together, taking into account the first and second loss functions (LF1, LF2). The system executes a method including receiving a test input (91) comprising an image showing crop plants of a crop species in an agricultural field and showing weed plants of one or more weed species among said crop plants; predicting the presence of one or more weed species (11, 12, 13) which are present in the respective tile; outputting a corresponding intermediate feature map to the segmentation module as output of the classification task; generating a mask for each weed species class as segmentation output of the second task by extracting multiscale features and context information from the intermediate feature map and concatenating the extracted information to perform semantic segmentation; and generating a final image (92) indicating for each pixel if it belongs to a particular weed species, and if so, to which weed species it belongs.

20 Claims, 8 Drawing Sheets

(58) Field of Classification Search
USPC .......................................................... 382/110
See application file for complete search history.

(56) References Cited

OTHER PUBLICATIONS

L. Tian et al., "Development of a Precision Sprayer for Site-Specific Weed Management", American Society of Agricultural Engineers 0001-2351, vol. 42(4), 1999, pp. 893-900.

A. K. Mortensen et al., "Semantic Segmentation of Mixed Crops using Deep Convolutional Neural Network", CIGR-AgEng conference, Jun. 26-29, 2016, Aarhus, Denmark, 6 pgs.

M. Dyrmann et al., "Pixel-wise classification of weeds and crop in images by using a Fully Convolutional neural network", CIGR-AgEng conference, Jun. 26-29, 2016, Aarhus, Denmark, 6 pgs.

I. Sa et al., "weedNet: Dense Semantic Weed Classification Using Multispectral Images and MAV for Smart Farming", IEEE Robotics and Automation Letters, vol. 3, No. 1, Jan. 2018, pp. 588-595.

A. Milioto et al., "Real-time Semantic Segmentation of Crop and Weed for Precision Agriculture Robots Leveraging Background Knowledge in CNNs", IEEE International Conference on Robotics and Automation (ICRA), May 21-25, 2018, Brisbane, Australia, pp. 2229-2235.

Liu et al., "Real-Time Pixel-Wise Classification of Agricultural Images Based on Depth-Wise Separable Convolution", Scientia Agricultura Sinica, 2018, Abstract Only, 2 pages.

SYSTEM AND METHOD FOR IDENTIFICATION OF PLANT SPECIES

CROSS-REFERENCE TO RELATED APPLICATION(S)

This application is a national stage entry under 35 U.S.C. § 371 of International Application No. PCT/EP2020/074600, filed on Sep. 3, 2020, which claims the benefit of priority of European Patent Application No. 19195608.5, filed on Sep. 5, 2019, the disclosures of which are hereby incorporated by reference herein in their entireties.

TECHNICAL FIELD

The present invention generally relates to electronic data processing, and more particularly, relates to image processing methods, computer program products and systems for weed identification in agricultural fields.

BACKGROUND

The presence of weed communities in crop fields has a negative impact (cf. H. van Heemst, "The influence of weed competition on crop yield," Agricultural Systems, vol. 18, no. 2, pp. 81-93, 1985). Weed in the context of this document relates to any plant growing in a field which is different from the crop grown in the field. Studies have identified two main reasons: competition and plant health-issues. Certain plant species (e.g., weeds) compete with crops for soil, nutrients and sunlight causing crops to grow slower and lesser. Also, some weeds are hosts for pests and diseases. For that, farmers use herbicides to exterminate or control weed populations.

The following table includes some examples of weeds and their respective EPPO-Codes:

TABLE 1 weed examples

| Species | EPPO-CODE |
|---|---|
| Setaria verticillata | SETVE |
| Digitaria sanguinalis | DIGSA |
| Echinochloa crus-galli | ECHCG |
| Abutilon theophrasti | ABUTH |
| Chenopodium albums | CHEAL |
| Amaranthus retroflexus | AMARE |

Thus, nowadays agriculture faces one complex challenge: The necessity of minimizing the impact on the environment assuring the optimization of the available resources to optimize the food yield. Taking weed control as an example, farmers usually apply the same amount of herbicide per surface disregarding the fact that different weeds have distinct density, growth-rate and growing stage. Nevertheless, biological studies show that the use of different types and rates of herbicides optimizes the effectiveness of the product, achieving better crop growth and reducing the chemical deposition to the environment. The early identification of weeds allows an optimization and increased performance in the use of phytosanitary products, leading to a less intensive and more specific herbicide use.

New technologies have brought Site Specific Weed Management (SSWM) (cf. L. Tian, J. F. Reid, and J. W. Hummel, "Development of a precision sprayer for site-specific weed management," Transactions of the ASAE, vol. 42, no. 4, p. 893, 1999), that includes applying the precise quantity of herbicide only on a region where weed is present. SSWM greatly reduces the use of herbicides by spraying optimally. The two critical tasks when applying SSWM are achieving accurate discrimination between weeds and crops, and appropriate weed quantification and staging. The traditional way to tackle that problem is to manually segment the plants on an image, which costs a great amount of time.

More recently, machine learning techniques based on convolutional neural networks (CNN) have been introduced. Although CNNs have many applications in agriculture, weed quantification has not yet been solved at a satisfactory level. Semantic segmentation for identifying weeds in an agricultural field based on pre-trained standardized CNNs does not perform well enough for plant image datasets due to domain differences. Semantic segmentation implies understanding an image at pixel level, i.e., to assign each pixel in the image an object class. In addition, the intrinsic complexity of segmenting plants with very little visual differences prevents a successful application of standardized CNN topologies for solving the weed identification problem with sufficient accuracy for a farmer.

Mortensen et al. presented a work on semantic segmentation of crop and weeds using deep learning (cf. A. K. Mortensen, M. Dyrmann, H. Karstoft, R. N. Jorgensen, R. Gislum, et al., "Semantic segmentation of mixed crops using deep convolutional neural network," in CIGR-AgEng Conference, 26-29 Jun. 2016, Aarhus, Denmark. Abstracts and Full papers, pp. 1-6, Organising Committee, CIGR 2016, 2016) where they obtained pixel accuracy of 79% at semantic segmentation of different crop species. Later on they were able to distinguish corn crops from 23 different weed species correctly labeling the pixels as "corn" or "weed" in real cases with a great pixel accuracy of 94% (M. Dyrmann, A. K. Mortensen, H. S. Midtiby, R. N. Jorgensen, et al., "Pixel-wise classification of weeds and crops in images by using a fully convolutional neural network," in Proceedings of the International Conference on Agricultural Engineering, Aarhus, Denmark, pp. 26-29, 2016). Other authors have worked on semantic segmentation of crops and weeds with deep CNNs to find new architectures and methods that could lead to better segmentation. In 2018 Sa et al. (cf. I. Sa, Z. Chen, M. Popovic, R. Khanna, F. Liebisch, J. Nieto, and R. Siegwart, "weednet: Dense semantic weed classification using multispectral images and may for smart farming," IEEE Robotics and Automation Letters, vol. 3, no. 1, pp. 588-595, 2018) obtained 80% F1-score at segmenting crop and weed with their modified VGG-16 called weedNet, and Milioto et al. (cf. A. Milioto, P. Lottes, and C. Stachniss, "Real-time semantic segmentation of crop and weed for precision agriculture robots leveraging background knowledge in cnns," in 2018 IEEE International Conference on Robotics and Automation (ICRA), pp. 2229-2235, IEEE, 2018) achieved a mIoU of 80.8% at pixel-wise classification of crop, weed and soil. Such prior art works focus on crops, taking every weed species as a single class (in terms of classification). The pixel accuracy obtained with such prior art methods is not yet at a satisfactory level to sufficiently support farmers optimizing their activities to protect their fields.

SUMMARY

There is therefore a need to provide systems and methods with improved image analysis functions for the identification of plant species. Thereby, plant species identification as used herein relates to the problem of volume quantification of plants belonging to particular plant species, such as for example, weed species competing with crop in an agricultural field. That is, the result of the plant species identification process is the information about which plant species are present in an agricultural field and where exactly plants of a particular species can be found. Further, there is an interest in gaining additional information about the presence and volume of different parts of respective plants, such as for example, stem, leaves, fruits, etc. of a plant. For example, such information with higher granularity regarding plant elements (e.g., fruits) of a particular plant species can provide useful information with regards to the potential crop yield provided by a particular agricultural field, or even the risk that certain weeds may rapidly expand because of the number of seeds to be expected.

The problem of weed volume quantification is solved by the application of semantic segmentation techniques using a CNN topology which results in a higher pixel accuracy in the segmentation of weeds than achievable with previously known segmentation approaches, such as for example, a standard PSPNet.

Embodiments of the invention comprise a computer-implemented method for identifying plant species in a crop field, and a computer program product with computer readable instructions that, when being stored in a memory of a computer system and being executed by one or more processors of the computer system, causes the one or more processors to execute the method. A further embodiment relates to the computer system, which is configured to execute the computer implemented method (e.g., when running said computer program product).

The computer-implemented method for identifying plant species in a crop field uses a particular convolutional neural network which is referred to herein as dual task CNN. The dual task CNN has a topology with is configured to perform two different tasks. Each of the tasks is associated with its associated loss function and the entire dual task CNN is trained by taking into account the two (different) loss functions. With this approach, the first task—a classification task performed by an intermediated module—is guiding the second task—a segmentation task performed by a semantic segmentation module of the dual task CNN leading to an improved overall accuracy of the plant species segmentation results. The semantic segmentation module is also referred to as "segmentation module" herein.

The intermediate module of the dual task CNN executes the first task in determining plant species which are present on a test input image. Thereby, the first task is associated with a first loss function. Determining a plant species corresponds to a classification task. Therefore, the intermediate module can be implemented by a classification neural network or a regression neural network (e.g., based on a Residual Network using a RESNET* backbone, such as for example, a RESNET50 convolutional neural network). When using a classification neural network (i.e. a neural network configured to perform a classification task), the output is the information about which plant species are present on a particular image showing, for example, crop and weed plants. When using a regression neural network, in addition, the information about the ratios of the present plant species is provided. Both CNN types provide the information about the plant species being present on a test input image with crop and weed plants.

In case a classification neural network is used as intermediate module, the first loss function advantageously is "weighted binary cross-entropy" where each sample (pixel) is weighted depending on the class it belongs to. The intermediate module uses "sigmoid" as last activation layer to support the presence of multiple classes simultaneously. For example, an analyzed section of the test input image (i.e., a tile of the image) may simultaneously include pixels belonging to corn plants, weed plants of different weed species and soil. A sigmoid activation layer can deal with such multiple classes simultaneously when making a prediction regarding the presence of the various classes on the text input image.

Binary cross-entropy and categorical cross-entropy and are known by experts in the field. Weighted categorical cross-entropy:

$$\text{weighted\_categorical\_cross-entropy} = \Sigma_{c=1}^{M} w_c * y_{o,c} * \log(\hat{y}_{o,c})$$

is similar to categorical cross-entropy but with the addition of a weight $w_c$.

$y_{o,c}$ represents if the target class belongs to the pixel, and $\hat{y}_{o,c}$ is the value predicted by the method. The same applies to binary cross-entropy and weighted binary cross-entropy. Selected weight values $w_c$ can range between 0 to 1000. For example, a weight value can be 0 for pixels that were not annotated by the expert. For the annotated pixels, an appropriate weight could be the inverse of the percentage of the pixel class on the dataset.

In case the intermediate module is implemented by a regression neural network the first loss function is advantageously "mean squared error" or "mean average error". The intermediate module may use "linear" or "sigmoid" as last activation layer to support the presence of multiple classes simultaneously.

The segmentation module of the dual task CNN performs a second task in segmenting the test input image to determine a class for each pixel of the test input image. The classes include the determined plant species. The second task is associated with a second loss function which differs from the first loss function. Advantageously, the second loss function is "weighted categorical cross-entropy". For example, the segmentation module may be implemented by a pyramid pooling module (e.g., based on a PSPNet, DeepLab or Piecewise topology).

In other words, each task performed by the dual task CNN is optimized based on its own loss function. However, the intermediate module and the segmentation module are being trained together, taking into account the first and second loss functions. This joint training of the two modules with the two different loss functions has the effect that the training of the intermediate module is affected by the training of the segmentation module and vice versa leading to an improved pixel accuracy of the final segmentation results. The training of a classic PSPNet for semantic segmentation (cf. H. Zhao, J. Shi, X. Qi, X. Wang, and J. Jia, "Pyramid scene parsing network," in Proceedings of the IEEE conference on computer vision and pattern recognition, pp. 2881-2890, 2017") relies on a two stage training process with generating initial results by supervision with an intermediate segmentation loss, and a second step learning the residue afterwards with a final loss. Thus, optimization of the deep learning neural network is decomposed into two optimization tasks with each optimization task being simpler to solve. However, although this approach can lead to good results, learning from the first (intermediate) loss vanishes while training with the network with the second (final) loss. Despite advantages which can be realized when using a classic PSPNet for sematic segmentation, it lacks the ability for extracting classes that are present in only a few percentages of the pixels of the analyzed image. This problem is solved with the disclosed extension of the classic segmentation module (e.g., PSPNet) by adding a second classification or regression task (performed by the intermediate module) being trained simultaneously with the segmentation task (performed by the segmentation module). This provides a guiding to the learning process by the two loss functions simultaneously.

Contrary to the classic PSPNet approach where the neural network is divided into two different problems that are trained sequentially with a single loss function being active at a given point in time as the training strategy, in the herein disclosed approach both tasks (classification and segmentation task) are being trained at the same time (i.e. simultaneously) by a simple weighted addition of the respective loss functions of both tasks.

The herein disclosed dual task CNN topology extends the classic semantic segmentation network into a real dual task network where network weights are optimized simultaneously against the two loss functions, thus, the classification loss guiding the segmentation loss. Loss functions may be weighted cross-entropy functions where each sample (pixel) is associated with a weight. In the following, a training data set for the dual task CNN is described which combines different data subsets where one data subset includes manually annotated images and a further data subset includes automatically annotated images. The sample weight can be related to the data subset the target belongs to. Samples from the data subset with automatically annotated images may have a higher weight than samples from the manually annotated dataset. Typically, the manually annotated data subset includes pixels that have been classified as 'other' or 'unknown' by a human. On such pixels, the weight may be decreased (e.g., by a number in the range of 10 to 1000) in order to reduce the influence of such pixels on the training of the dual task CNN while having a remaining small weight to allow domain adaptation to real images. Thereby, the reduction of a weight can however not result in a negative number.

Advantageously, the dual task CNN modules are jointly trained based on an image training data set which includes a combination of two training data subsets with one subset including manually annotated training images and the other subset including automatically annotated training images.

For example, a first data subset may include images showing real world situations in an agricultural field with crop plants of a particular crop species and weed plants of one or more weed species wherein the weed plants are spread between the crop plants. The first data subset has manual pixel annotations indicating the plant species to which the pixels of the training images belong. Typically, a human user is looking at each of the images in the first data set and marks certain subsections of the image as belonging to a particular class (e.g., crop species, weed, species, soil). In one implementation, the manual pixel annotations may be at a higher level of granularity in that not only pixels of plants of a particular plant species are annotated with the respective plant species, but, in a hierarchical manner, the particular plant species may also have sub-classes for the annotation of various plant elements, such as stem, leaf, fruit, etc. That is, the annotation can be performed with tags such as corn1, corn1:leaf, corn1:fruit, weed1, weed1:leaf, weed1:fruit, etc. In most cases, such annotations are quite inaccurate at the pixel level because the user simply indicates rectangle shapes (or other shapes including free form shapes) on the image and enters an annotation for the indicated area. In view of the natural distribution of the classes in a training image it is clear that such manual annotations can only be rough approximations.

For this purpose, the first data subset is complemented (enhanced) by a second subset which includes training images with automatically generated annotations which are correct at the pixel level. Obtaining automatically annotated training images may be achieved in different ways.

For example, a second data subset may include images showing a plurality of plants of different plant species originally obtained from single plant images. Thereby, each single plant image shows a single plant of a particular species. A test image can then be synthesized by extracting from the single plant images the image portions belonging to the respective single plants and pasting the extracted image portions into a soil background image. Thereby, multiple single plant images may be associated with various plant species. However, for each single plant image the respective species is known and the extracted image portions which are later pasted into a soil background image are associated with the respective annotation at the pixel level (because it is known that each pixel of the extracted section shows parts of the plant of the respective species). Therefore, the pixels of the second data subset are automatically annotated with the class (species) they belong to as known from the original single plant images.

For example, another data subset with automatically generated annotations can be a third data subset including real world situation images showing a plurality of (weed) plants of a single (weed) species (typically also showing different growth stages of the same plant species in one image). As the third data subset only includes plants of a single species, the pixels can easily and automatically be annotated with the corresponding class annotations corresponding to the respective plant species. For example, well known leaf segmentation algorithms can be used to extract all pixels from an image of the original real-world single-species image and annotate them with the corresponding class information.

The trained dual task CNN is then applied to a test input image in the following way: A test input is received by the computer system running the dual task CNN. The test input includes an image showing plants belonging to different species. For example, the image may show crop plants of a particular crop species in an agricultural field and weed plants of one or more weed species among said crop plants (i.e., being spread between the crop plants).

The computer system has an image tile extractor which extracts tiles from the test input image having the dimensions of the input shape of the intermediate module. Typically, the test input images are expected to be of high resolution. It is assumed that the dual task CNN has also been trained with images of similar resolution. For example, an image with a resolution of 1024×1024 to 10,000×10,000 pixels or more is considered to be a high-resolution image. The dimensions of the input shape (first layer) of the intermediate module however are lower (e.g., the input shape of a typical RESNET50 based classification neural network can be (473, 473, 3). Therefore, the image tile extractor is dividing the test input image into image tiles matching the input shape of the intermediate module.

In the following, each of the extracted tiles is processed separately and at the end of the segmentation task the segmented tiles are reconstructed into the entire segmented image. For each extracted tile, the intermediate module predicts the presence of one or more plant species which are present in the respective tile. The output of this first (classification) task to the segmentation module is an intermediate feature map with all the features classified by the intermediate module.

The segmentation module uses the intermediate feature map in generating a mask image where each pixel on the mask is associated with a "0-1" value (i.e. a value in the interval [0, 1]) representing the probability for said pixel to belong to the associated class. This is achieved by extracting multiscale features and context information from the intermediate feature map and concatenating the extracted information to perform semantic segmentation.

Finally, the generated masks (a mask for each tile) are combined into a final image. The final reconstructed image corresponds to the original test input image with additional information indicating for each pixel if it belongs to a particular plant species, and if so, to which species it belongs. For example, color coding may be used where each plant species is assigned to a unique color and the pixel colors of the pixels in the final image are adjusted with the assigned color.

When the segmentation module is implemented by a pyramid pooling module for performing semantic segmentation, it typically includes four separate filters with different receptive fields which scan the intermediate feature map provided by the intermediate module, and create four arrays for multi-scale feature detection to integrate information of different scales and sizes.

Further, the pyramid pooling module typically includes a plurality of up-sampling layers configured to restore the image size of each array to the size of the intermediated feature map using bilinear interpolation. Further, convolutional layers of the pyramid pooling module extract contextual information from the four separate filters and concatenate the contextual information with the information of different scales and sizes to generate a final feature map of the same size as the intermediate feature map. Further, the pyramid pooling module typically includes fully-connected layers to compute final pixel-wise predictions as the generated masks with a last activation layer "softmax". The "softmax" activation function is advantageous because it turns numbers aka logits into probabilities that sum to one. Logits are the raw scores output by the last layer of a neural network before activation takes place. In general, the "softmax" function outputs a vector that represents the probability distributions of a list of potential outcomes. Applied to the plant species segmentation problem, the pixels are mutually exclusive in that each pixel can only belong to exactly one class (e.g., the pixel is either soil or a plant of a particular species, but not both at the same time). "softmax" therefore predicts the probability for each pixel to belong to a certain class (e.g., plant species or soil).

Further aspects of the invention will be realized and attained by means of the elements and combinations particularly depicted in the appended claims. It is to be understood that both, the foregoing general description and the following detailed description are exemplary and explanatory only and are not restrictive of the invention as described.

SHORT DESCRIPTION OF THE FIGURES

FIG. 1 includes a block diagram of a computer system for identifying plant species in a crop field using a dual task convolutional neural network according to an embodiment;

DETAILED DESCRIPTION

Figure 1:
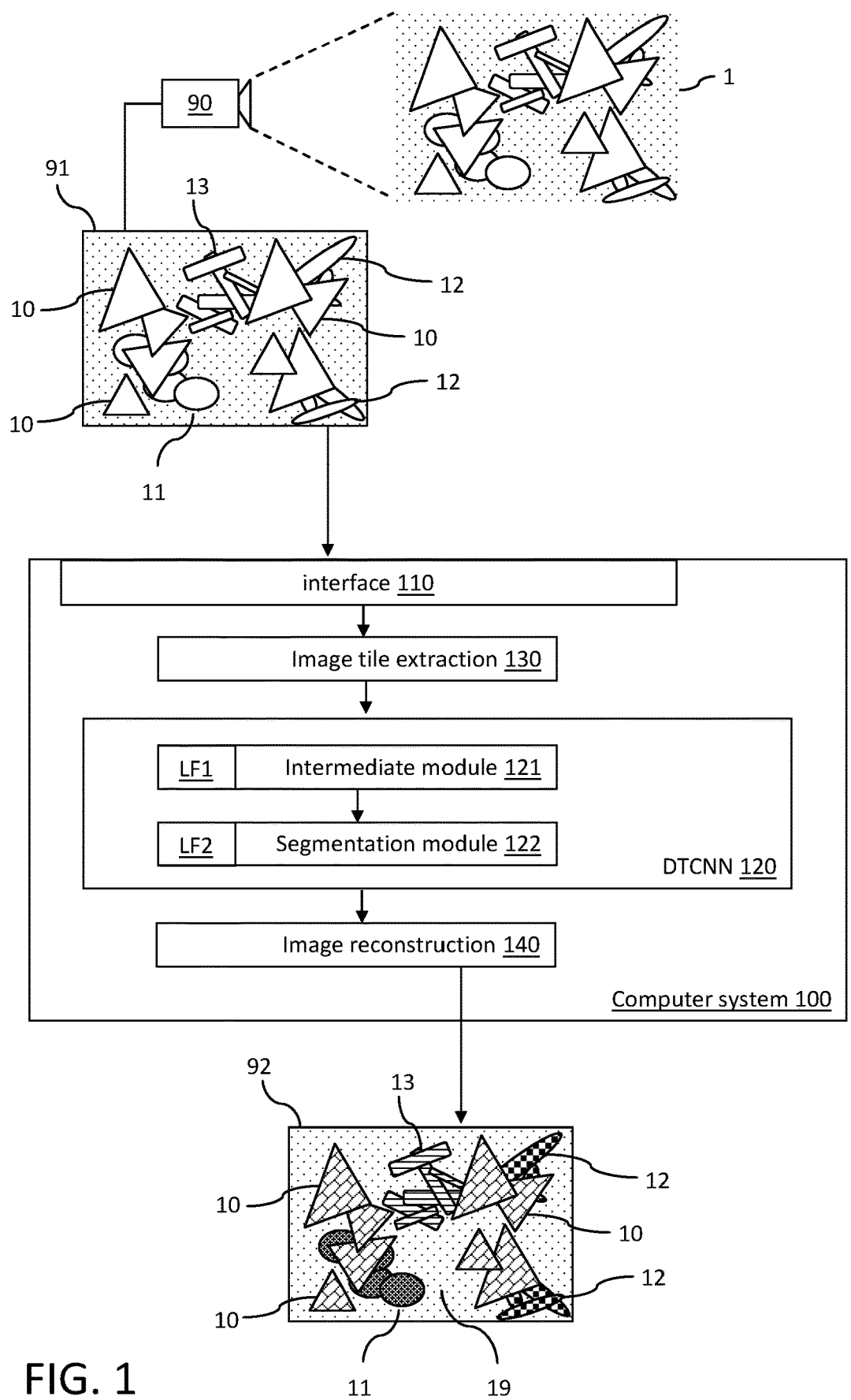
Figure 2:
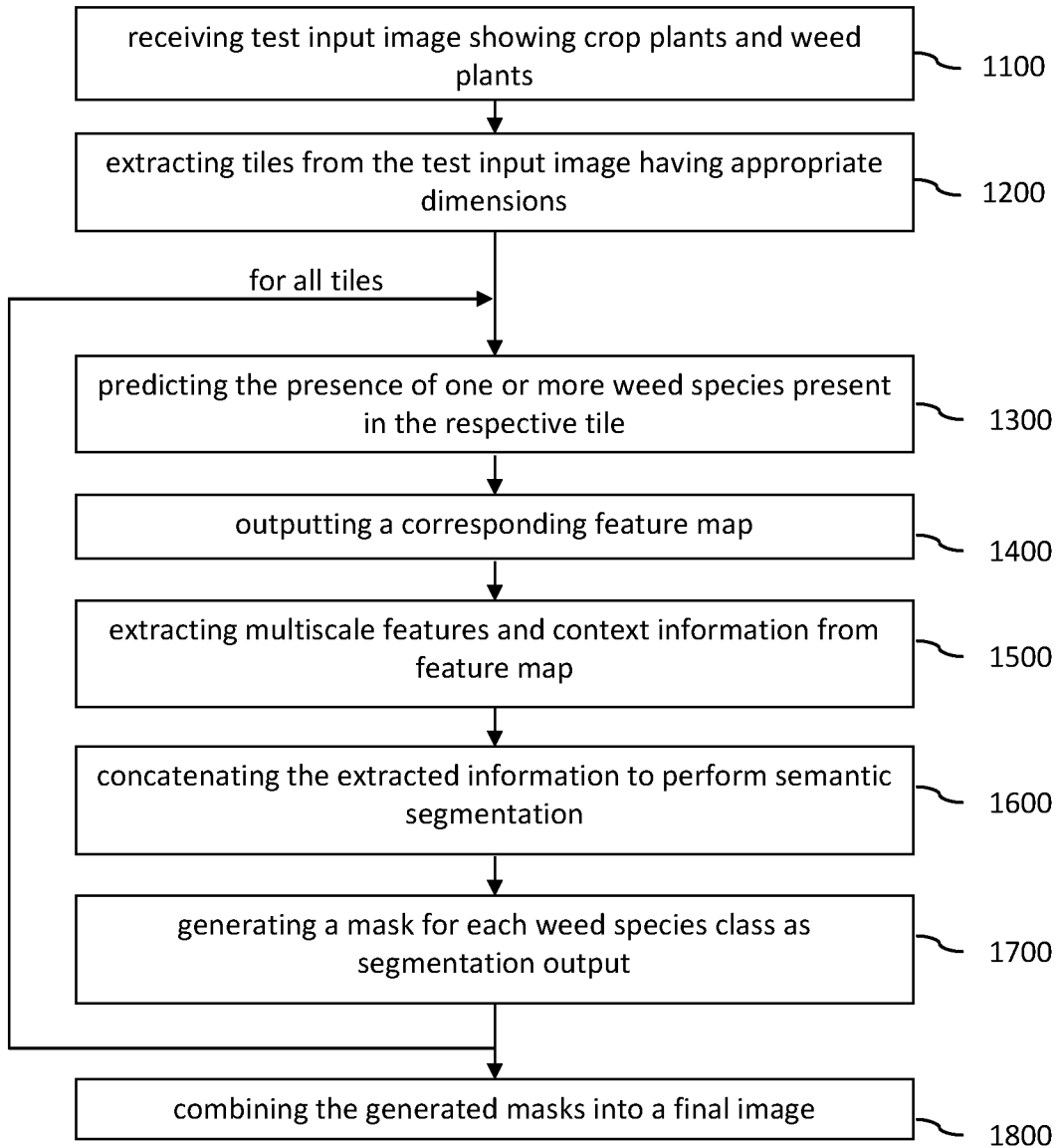
FIG. 2 is a simplified flow chart of a computer-implemented method for identifying plant species in a crop field according to an embodiment.
Figure 3:
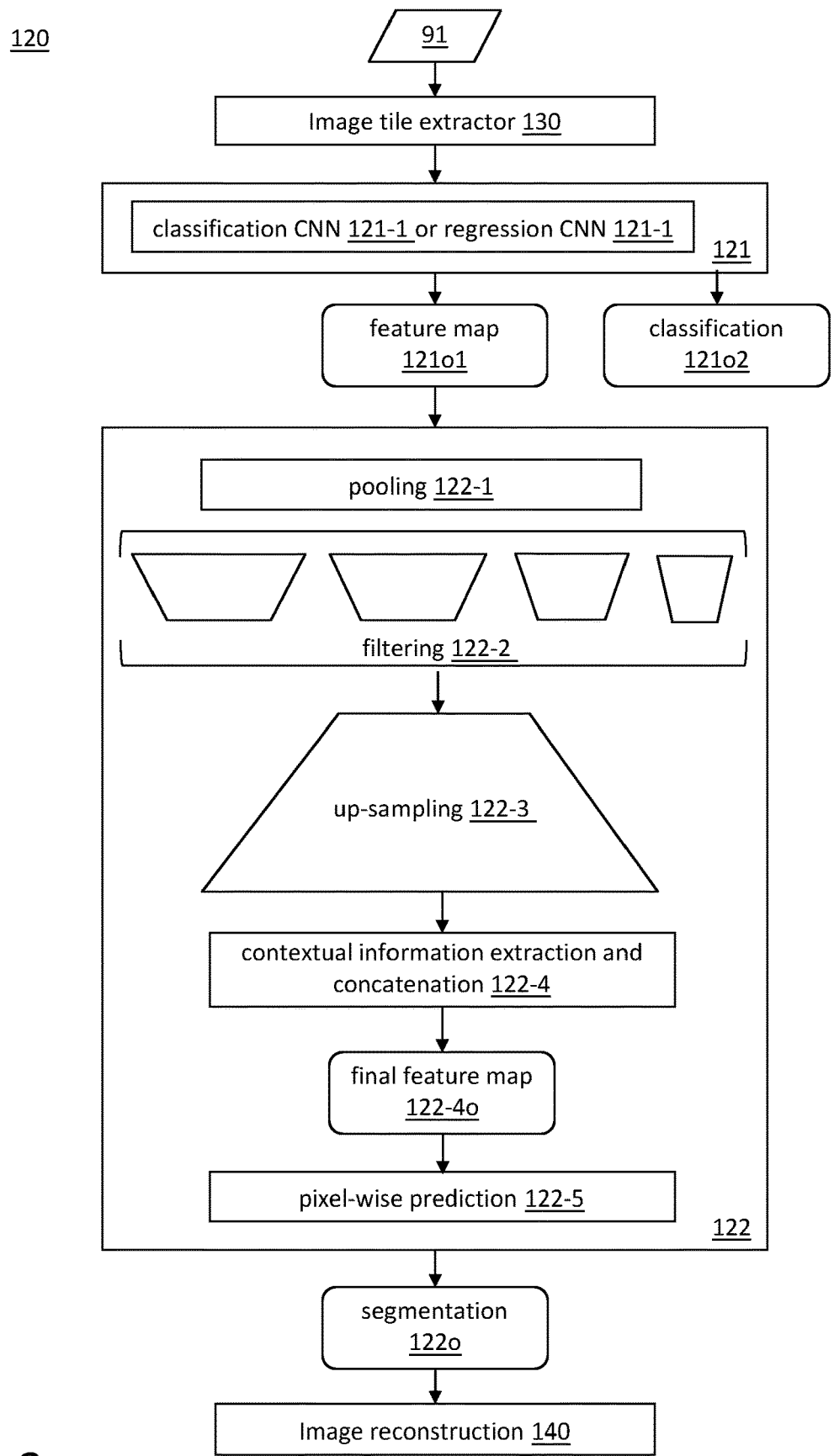
FIG. 3 illustrates an example topology of a dual task convolutional neural network according to an embodiment.

FIG. 1 includes a block diagram of a computer system 100 for identifying plant species (e.g., crop or weed species) in a crop field using a dual task convolutional neural network 120 according to an embodiment. FIG. 2 is a simplified flow chart of a computer-implemented method 1000 for identifying plant species in a crop field according to an embodiment. The method 1000 may be executed by the computer system 100. In the following detailed description, the method 1000 of FIG. 2 is disclosed in the context of the system 100 of FIG. 1. Therefore, the description refers to reference numbers used in both figures. Further, FIG. 3 illustrates an example topology of a dual task convolutional neural network 122 according to an embodiment. The description will therefore also refer to reference numbers of FIG. 3 in the context of the description of FIG. 1 when example embodiments are discussed for components or modules of the computer system 100.

The goal of the computer system 100 is to support a farmer to identify the species and the location of plants which grow between crop plants in a section 1 of an agricultural field (freeland or greenhouse). Such sections are also sometimes referred to as plots in literature. In the figure, different object shapes are used to distinguish between different plant species. In the example, triangles are used to represent crop plants of a particular species grown in the field. All other shapes represent weed plants of different weed species. The dotted background represents the soil parts in section 1 (i.e., the parts of the ground which are not hidden by plants). An image recording device 90 (e.g., a digital camera capable of recording high resolution pictures with a resolution in the range of 1024 up-to 10000 px) takes an image of section 1 and provides the image as a test input image 91 to the computer system 100 where it is received 1100 by a corresponding interface 110. The test input image 91 schematically shows crop plants of a crop species 10 (triangles) in the agricultural field where section 1 belongs to. Further, the test input 91 shows weed plants of one or more weed species 11, 12, 13 among said crop plants. The weed plants are spread between the crop plants (crop species 10). In a natural field situation, weeds of different weed species can be spread quite regularly or they may appear in certain clusters. In the example, there is a cluster of weed plants of species 11 (e.g., *Digitaria sanguinalis*), a cluster of weed plants of species 13 (e.g., *Setaria verticillata*), and two clusters of weed plants of species 12 (e.g., *Chenopodium albums*). As illustrated in the schematic example, plants in the image 91 can have overlapping parts. For example, some crop plants overlap other crop plants and overlap some of the weed plants (as schematically shown in FIG. 1). Weed plants may also overlap crop plants.

Besides the interface 110 for receiving test input images (and also training images), the computer system has an image tile extraction module 130 which extracts tiles from the test input for further processing. Further, an image reconstruction module 140 is used to reconstruct the processed tiles at the end into a full-blown segmented image 92 which is output to the user (e.g. a farmer). The image processing for achieving a semantic segmentation of the text input image is performed by a dual task convolutional neural network 120 (DTCNN). DTCNN 120 has two submodules:

an intermediate module 121 for executing a first task in determining weed species 11, 12, 13 which are present on the test input image 91. The first task is associated with a first loss function LF1 for optimization purposes of the DTCNN. The first task (classification) of the DTCNN model analyzes the input image tile by tile and predicts the presence of the different classes in each small portion (i.e. tile) of the input image.

a segmentation module 122 for executing a second task in segmenting the test input image 91 to determine a class for each pixel of the test input image 91. Of course, classes by pixel are exclusive in that a particular pixel can only belong to a single class. Once an image tile has passed through the classification task, it is reduced to a feature map that is passed to the segmentation module. The classes include the determined weed species (and also the crop species and soil species). The second task is associated with a second, different loss function LF2. The generated 1700 output of the segmentation module for each tile is a corresponding mask for each class. This mask is represented by an image having the same size as a tile, where each pixel is associated with a value in the interval [0, 1] representing the likelihood of that pixel to belong to the associated class. The closer the value is to 1, the more probable the pixel belongs to that class. Values above a predefined threshold value are considered as belonging to the class. This binary mask is considered as the segmentation task output generated 1700 by the segmentation module.

A final post-process interprets and combines those masks to reconstruct all tiles into the final segmented image.

The DTCNN model shows a degree of invariance to different illumination conditions (e.g., of plot 1), leaf overlapping, background and multiscale detection which outperforms the models used in prior art approaches.

Before applying DTCNN 120 to a test input, the network gets trained with images of a training dataset whereby the intermediate module 121 and the segmentation module 122 are trained together, taking into account the first and second loss functions LF1, LF2. This is done directly by minimizing against the two loss functions:

Combined_Loss=Loss_segmentation+
alpha*Loss_classification where alpha can be a number in the range of [0, 100]. Thereby, "Loss_segmentation" is associated with LF2 and "Loss_classification" is associated with LF1. For example, one may select alpha=0.2 and consider the weighted_categorical_cross_entropy loss function LF2 for the segmentation task and the weighted_binary_cross_entropy loss function LF1 for the classification task. That is, the training of both modules occurs concurrently with an optimization for two associated loss functions at the same time. As discussed earlier, prior art segmentation networks, such as the PSPNet topology, have two subsequent training stages where the training of the first stage gets pretty much lost when performing the training of the second stage. In contrast, the joint training approach with a separate loss function for each task allows a separated measurement of the performance of each task through the respective loss function while, at the same time, setting the weights for the entire topology of DTCNN 120 including the intermediate module 121 (for classification tasks) and the segmentation module 122 (for segmentation task).

The disclosed network architecture 120 was selected by analyzing the intrinsic characteristics that describe the kind of images to be segmented. As color does not provide additional information (weed and crop plants are typically all green), the decision-making is rather to be based on the analysis of shapes and borders of the plants. The DTCNN has three main properties:

Extraction of spatial information: The model can segment groups of leaves but what it actually does is to classify all pixels on an image one by one. Thereby, the network focuses on single pixels but, at the same time, is able to extract spatial information to segment objects. Thus, the model learns as an abstract concept what a leaf is in that it learns which pixels in a certain region belong the leaf. This property is referred to as 'pixel grouping'.

High feature resolution: The leaves of different weed species can be very similar. Sometimes there are images where the difference between two kinds of leaves is visible in just about 20 pixels of the entire high-resolution test input image. This implies, that the DTCNN needs to learn filters to detect such minor differences focusing on small groups of pixels. This is also true with regard to learning filters to detect subelements of the various plants (e.g., fruits, stem, etc.)

Multiscale detection: typically, the scale of the leaves changes from image to image. In many cases, different plants at different growing stages are shown in the same image. Therefore, the DTCNN has to recognize the same kind of leaf (i.e. leaves of the same plant species) at different ages and different sizes coexisting in the same image. For example, in later growth stages, a plant may already carry fruits. Therefore, learning the characteristics of fruits which are specific for particular species may also help to recognize said species.

The Pyramid Scene Parsing Network (PSPNet) is a deep learning model published in 2017 by Zhao et al. (see above) specialized in semantic segmentation for scene understanding. This includes to classify each pixel of an image as part of an object, taking into account the color, shape and location of each element in the image. PSPNet is a standard semantic segmentation network that aggregates two main features: multi-scale information (the pyramidal module) and contextual information. At the 2012 PASCAL VOC dataset (cf. M. Everingham, L. Van Gool, C. K. Williams, J. Winn, and A. Zisserman, "The pascal visual object classes (voc) challenge," International journal of computer vision, vol. 88, no. 2, pp. 303-338, 2010) the PSPNet performed better than other models such as DeepLab (cf. L.-C. Chen, G. Papandreou, I. Kokkinos, K. Murphy, and A. L. Yuille, "Deeplab: Semantic image segmentation with deep convolutional nets, atrous convolution, and fully connected crfs," IEEE transactions on pattern analysis and machine intelligence, vol. 40, no. 4, pp. 834-848, 2018) or Piecewise (cf. G. Lin, C. Shen, A. Van Den Hengel, and I. Reid, "Efficient piecewise training of deep structured models for semantic segmentation," in Proceedings of the IEEE Conference on Computer Vision and Pattern Recognition, pp. 3194-3203, 2016). Further, PSPNet appears to fit to the parameters needed to solving the weed identification problem, as it has a pyramid pooling layer (for multi-scale detection), it specializes in semantic segmentation (high resolution) and scene parsing (contextual information). Nevertheless, a skilled person may also use any of the other semantic segmentation modules known in the art as a basis for the segmentation module 122.

However, the results when applying a classic PSPNet topology to a real field situation image are not satisfying. A problem is that usually semantic segmentation datasets for training present very different classes. Discrepancies can be found in color, shape and textures and thus the different models specialize in gathering all this information to predict each pixel. On the other hand, the classes present on the images with crop and different weed species are very similar classes in shape and color. Differences are primarily found, in small borders and edges of plant leaves (or other characteristic plant elements such as plant fruits). Further, real field images typically show leaf overlapping, changing illumination, as well as different multi-scale and growing stage morphologies. For such reasons pre-trained networks perform poorly for plant image datasets.

The ability of PSPNet to extract contextual information can even be counter-productive. In other detection scenarios, for example, detecting sky as background, can help classifying a plane or aircraft. However, in plant image datasets the background and neighbor objects often look almost the same as the target to be identified. Using that information can actually mislead the classification. Further, all leaves have almost the same color. Usually a single object presents common pixel intensities (color) that distinguish the object from other objects. In this case all leaves look similar on that part, so that color does not provide additional information. Therefore, the training of the DTCNN 120 is focused on edges and borders.

To benefit from the advantages of a semantic segmentation module in the application to plant image datasets, a classification task is added to the topology of the DTCNN 120. The model is trained to classify small portions of the image at the same time so that it learns pixel-wise classification. With this modification of a classic semantic segmentation net, such as the PSPNet, improves pixel grouping (with the classification task) without losing focus on detecting minor differences (with the segmentation task). It is thereby critical that the classification task is associated with its own loss function and the segmentation task is also associated with its own loss function, and that both tasks are trained together simultaneously taking into account both loss functions at the same time.

Once the computer system 100 has received the test input image 91, the extraction module 130 extracts 1200 tiles from the test input image having the dimensions of the input shape of the intermediate module 121. The input to a CNN is always a 4D array. So, input data has a shape of (batch_size, height, width, depth), where the first dimension represents the number of images processed each time and the other three dimensions represent the dimensions of the image which are height, width and depth. The depth of the image is the number of color channels. For example, RGB image would have a depth of 3 and the greyscale image would have a depth of 1. For example, the intermediate module may be implemented as a classification CNN 121-1 or a regression CNN 121-2 based on a RESNET architecture, such as for example, a RESNET50 topology or any other appropriate member of the RESNET family of topologies. The dimensions of the first layer of the intermediate module determine the dimensions for the tiles into which the image is partitioned by the extractor 130 for further tile-wise processing. For example, in case of using a RESNET50 CNN topology the dimensions of a tile are adapted to meet a (473, 473, 3) input shape.

For each tile the intermediate module 121 predicts 1300 the presence of one or more plant species which are present in the respective tile. The output of the intermediate module includes a classification result 12102 providing (as classes) the plant species which are present on the test input image (of course, besides the classes for weed species, the classification result also includes classes for the crop species and the soil), and further includes a corresponding intermediate feature map with the extracted features associated with the identified classes. Only the intermediate feature map 12101 is output 1400 to the segmentation module 122 for further processing. The size of the intermediate feature map is a fraction (e.g., ⅛) of the size of input image (which corresponds to the size of a tile).

The example embodiment in FIG. 3 illustrates the segmentation module 122 being implemented with a pyramid pooling module based on a PSPNet topology. It is to be noted that the PSPNet outperformed other semantic segmentation topologies in test runs of the system. However, a person skilled in the art may also use other segmentation topologies to implement the segmentation module 122. In the PSPNet implementation, the intermediate feature map 12101 is typically processed by a pooling layer 122-1 performing an initial filter function in selecting from the intermediate feature map the features with the highest activations (i.e. features with a maximum of a local neighborhood of the activations).

The selected features are then forwarded to a filtering layer 122-2 implementing four separate filters with different receptive fields which scan the selected features of the intermediate feature map 121$o$1 and create four arrays for multi-scale feature detection to integrate information of different scales and sizes.

The filter to the right of the filtering layer 122-2 is the coarsest level which performs global average pooling over each feature map, to generate a single bin output. The filter following to the left is the second level which divides the feature map into 2×2 sub-regions and then performs average pooling for each sub-region. The next filter to the left is the third level which divides the feature map into 3×3 sub-regions and then performs average pooling for each sub-region. The filter to the left is the finest level which divides the feature map into 6×6 sub-regions and then perform pooling for each sub-region. In the example with N=4 filter levels and a number of input feature maps of M=2048, the output feature map is (¼)×2048=512, i.e. 512 number of output feature maps.

The next stage of the pyramid pooling module includes a plurality of up-sampling layers 122-3 configured to restore the image size of each array to the size of the intermediate feature map 12101 using bilinear interpolation. In general, bilinear interpolation is performed to up-sample each low-dimension feature map to have the same size as the original feature map.

The following convolutional layers 122-4 are configured to extract contextual information from the four separate filters and to concatenate 1600 the contextual information with the information of different scales and sizes to generate a final feature map 122-4$o$ of the same size as the intermediate feature map 121-$o$1. In other words, all different levels of up-sampled feature maps are concatenated with the original feature map. These feature maps are fused as global prior. Sometimes in literature, the convolutional layers 122-4 providing the final feature map 122-4o are seen as the end of the pyramid pooling module. However, in the context of this document, the pixel-wise prediction layer 122-5 is also considered to be a layer of the pyramid pooling module.

The pixel-wise prediction layer 122-5 is a convolution layer which uses the final feature map to generate a final prediction map. For example, it may be implemented by fully-connected layers 122-5 to compute the final pixel-wise predictions as generated masks with a last activation layer "softmax" (i.e., normalized exponential function). The advantage of a softmax activation has already been explained earlier. The final prediction result is a pixel-wise segmentation 122o of the currently processed image tile.

Once all extracted tiles have been processed by the DTCNN 120, the image reconstruction module 140 reconstructs a completely segmented image 92 which corresponds to the size of the original image and includes for each pixel the class to which it belongs. For example, the reconstructed image 92 can use a color code to indicate the class of the respective pixel. In the schematic illustration of FIG. 1, the segmented image 92 uses different textures to differentiate between the classes of the various pixels. For example, surfaces with pixels which are classified as belonging to class 10 (crop) are shown with a brick texture. Of course, textures cannot be used to mark a single pixel. However, distinct colors with a particular color value for each class can be used. Therefore, the textures are merely used as a simplified marking in the schematic view to illustrate the marking concept behind. For example, pixels belonging to weed plants of class 11 (first weed species) are marked by a grey shading texture, pixels belonging to weed plants of class 12 (second weed species) are marked by a chess board like texture, pixels belonging to weed plants of class 13 (third weed species) are marked by a stripe pattern texture. Finally, pixels belonging to the soil background class in the image 92 are marked by the dotted texture 19.

Figure 4A:
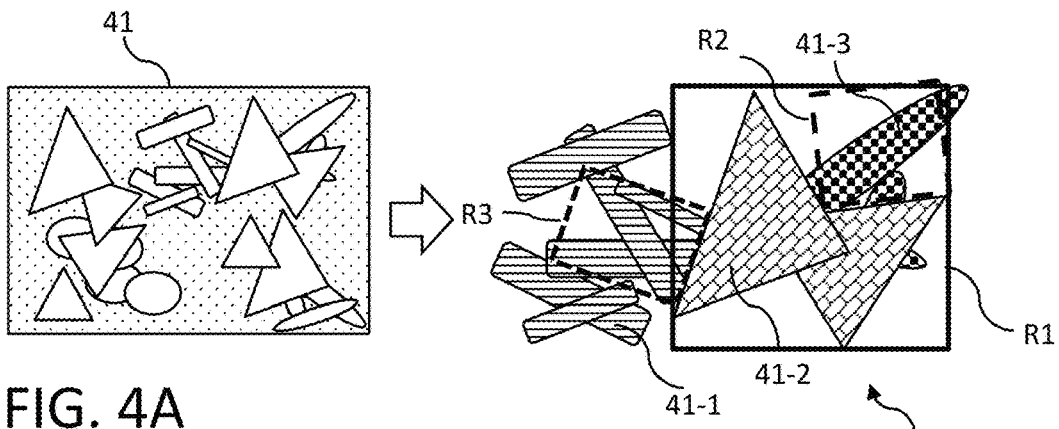
FIG. 4A illustrates generation of a first training data subset using manual annotation.
Figure 4B:
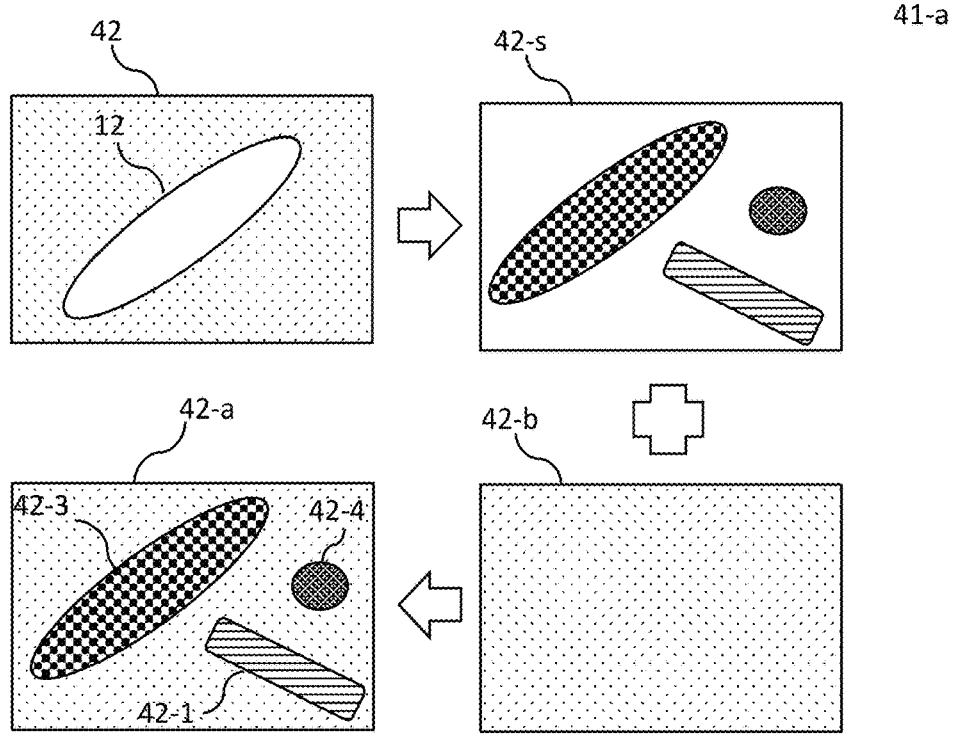
FIG. 4B illustrates generation of a second training data subset using automated annotation.
Figure 4C:
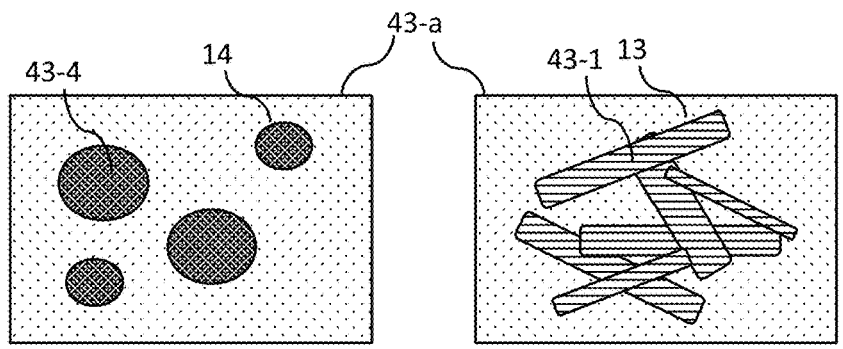
FIG. 4C illustrates generation of a third training data subset using automated annotation.

FIGS. 4A to 4C illustrate different methods for the creation of training data subsets which can be used for training the dual task CNN. An image training data set used for training the intermediate module together with the segmentation module of the DTCNN includes at least a first data subset generated using manual annotation of images as disclosed in FIG. 4A and a further subset generated with automatic annotation as disclosed in any of the FIGS. 4B and 4C.

FIG. 4A illustrated the creation of manually annotated training image of a first data subset of the training data. An original image 41 showing a real-world situation in an agricultural field with crop plants of a crop species and weed plants of one or more weed species amongst the crop plants is provided to a human user for manual annotation. The user tries to assign the different elements in the image to the corresponding classes (e.g., crop species, weed species, soil). The image 41 and its elements in the example of FIG. 4Aa correspond to the image 91 and its elements in FIG. 1. The result of the manual annotation task is for each training image belonging to the first data subset that the manual pixel annotations 41-1, 41-2, 41-3 indicate the species to which the pixels of the respective training image belong. The textures used in the annotated image 41-a correspond to the textures explained for image 92 in FIG. 1. In the example of FIG. 4A, the result of the manual annotation is schematically shown only the upper right corner of the original image 41. Although the schematic view implies that the annotation is correct at the pixel level this is not the case in reality for a manually annotated image. Typically, there are many pixels in a manually annotated image which are either assigned to a wrong class or to no class at all because the user was not able to recognize a certain plant. In other words, the manual annotations are noisy in the sense that many pixels are not correctly annotated.

Typically, a user is just selecting rectangles in the image and assigns such rectangles to a class. Rectangle R1 may be used to classify the pixels inside the rectangle as the crop species 41-2. However, R1 also contains pixels which relate to weed species 41-1 and 41-2. The user may indicate further rectangles R2, R3 within R1 or overlapping with R1 to assign them to the respective weed species classes. It is clear that such an annotation method cannot lead to a correct annotation at the pixel level. To support the user in the manual annotation task, the computer system may provide some classification support functions to the user.

For example, the system may provide for automated soil segmentation: A robust and simple color-based segmentation algorithm can be used automatically remove the presence of ground (soil) and automatically subtract it from the manual segmentation. An example algorithm is based on simple thresholding over the Lab color channel (of the L*a*b* Color space) where the pixels with positive values of channel a are removed from the segmentation to obtain a refined segmentation.

Further, the system may provide support for overlapping plant parts: Especially on later phenological stages, plant overlapping makes the annotation more complicated to precisely segment all classes. To alleviate this, the manual annotation function of the system allows marking an annotation inside of another annotation (e.g. R2 inside of R1). In this case, the inner annotation (assigned to R2) is removed from the segmentation belonging to the outer annotation (assigned to R1). This simplifies the annotation process as there is no need to precisely annotate all species. It is sufficient to annotate only the species overlapping with the "enclosing" annotation or any other annotation indicating overlap.

To generate the first image data subset, the following conditions prevailed in test runs for the system. An extensive image acquisition campaign was carried out in two different locations in Germany and Spain in the year 2017. A set of 24 plots with each of 2.0×2.5 m were planted. On these plots, two rows of corn (Zea mays) were planted along with 6 different weed species, three "grass leaf" weeds (Setaria verticillata, Digitaria sanguinalis, Echinochloa crus-galli) and three "broad leaf" weeds (Abutilon theophrasti, Chenopodium album, Amaranthus retroflexus). Each plot was imaged with a top view and perspective view using two different devices: a Canon EOS 700D SLR camera and Samsung A8 mobile phone. To facilitate image acquisition, a metallic structure was created to hold two mobile phones and two SLR cameras to acquire a top image (2.0 meters height, 18 mm focal length) and a perspective image (1.6 meters height, 30° angle, 18 mm focal length). Such four images may be taken simultaneously to save time but this has not impact on the quality of the training data.

Images were taken twice a day, three times a week over a period of 9 weeks in order to gather different phenological stages of corn and weeds. Trials started in May 2017 and ended in June 2017. After removing overexposed and/or blurred images a total number of 1679 images were manually segmented into the 7 targeted classes that are named according to their corresponding EPPO codes (ZEAMX, SETVE, DIGSA, ECHCG, ABUTH, CHEAL, AMARE).

Although the targeted weeds were planted at specific positions, wild growing of unknown weeds on the experimental plots made this task more complex. In order to cope with this issue, two new classes (generic broad leaf weed and generic grass leaf weed) were added allowing the annotation of unknown or not targeted weeds. The DTCNN topology was adapted to ignore these noisy annotations.

For training purposes, and to avoid any biasing, the experimental plots were separated into train, test and validation plots. 8 plots were used for training, 2 for validation and another 2 for testing.

The first data subset was then combined into the training image dataset with at least one further subset which can be either the second or the third data subset described in the following:

The generation of the second data subset is described in FIG. 4B. The second set is composed of synthetically generated images which can be automatically annotated in a correct manner at the pixel level. A final synthetically generated image 42-a of the second subset shows a plurality of weed plants of different weed species obtained from original single plant images 42 with each single plant image showing a single plant 12 of a single species. The single plant elements are extracted from the single plant images (e.g. with a leave segmentation algorithm) and pasted into a soil background image 42-b. Therefore, as the extracted single plant elements belong to known plant species (indicated by different textures in image 42-s), the second data subset can be completely automatically annotated at the pixel level with annotations 42-1, 42-3, 42-4 of the pixels belonging to the respective weed species. Such automatic annotations include far less noise than the manual annotations as the pixels extracted by the leaf segmentation algorithm include substantially only the pixels which really belong to the single plant and which can then be automatically annotated with the known species of the plant of the respective single plant image.

The combination of the first data subset with the second data subset overcomes several drawbacks of the first data subset where the annotation is difficult and prone to error due to the dataset's substantial complexity. As a consequence, the amount of annotated images for training and testing is limited and noisy. This can be overcome by using the synthetic images of the second subset containing image communities generated by single plant images in combination with the first subset. An additional acquisition campaign of single plants was performed for this purpose.

The synthetic dataset featured three new weed species: *Chenopodium*, *Datura stramonium* and *Fallopia convolvulus*. It consists of images with each image showing a single plant on a greenhouse 80×80 cm plot. There were two greenhouses from Spain. In each of them different species were sowed: AMARE, DIGSA, ECHCG and SETVE in Greenhouse 1; ABUTH, CHESS, DATST, POLCO and ZEAMX in Greenhouse 2. There was a total of 8 weeds and 1 crop. Out of each species 30-36 single plants were sowed. A single image was taken every labour day (M-F) for each of the individual plants, from day 0 to day 80. Not all of them made it to the last day so the final (second) data subset contained 6906 images of single plants of 9 different species and at different growing stages.

Since only one plant appears in each image, all images in the subset are labeled. Using a deep learning model for leaf segmentation allowed to automatically annotate the entire dataset. A synthetic plant community generator algorithm can take real leaf segmented images and paste them on a real background image. Using the single plant dataset allowed to automatically segment leaves and/or plants and store them into a candidate repository. After discriminating which candidates were viable the final folder contains 11096 images unevenly divided in 9 species. The community generator algorithm takes the candidates from the repository and pastes them in a specific way onto a soil image.

To generate these images, several random regions associated to three parameters describing a respective region are created. The model parameters are: plant species, growing stage and density. The plant species are grown following a Monte-Carlo approach accordingly to the region's parameters. The pipeline of this algorithm is the following:

(i) the growing regions are created as ellipses of random size;
(ii) each ellipse is randomly assigned with a class (species), age (days after sowing) and density (real number between 0 and 1);
(iii) a location point within the image is randomly sampled for each plant candidate;
(iv) depending on the location point a candidate would be within a growing region or not (in that case the potential candidate is rejected);
(v) if the candidate is located within an ellipse the algorithm randomly samples a number between 0 and 1 and compares it to the "density" parameter of its growing region: if the sampled number is greater than the "density" threshold the candidate is rejected;
(vi) the algorithm chooses from the candidate repository a candidate image that suits the requirements of the growing region and places it in the plot image.

By this method images were generated where several plant species are present at varying growing stages with in-homogeneous densities. The second data subset was created with 5000 synthetic images. Out of the 5000 generated plot images, 80% were reserved for training, 10% for validation and another 10% for testing.

FIG. 4C illustrates a third data subset which can be alternatively used in combination with the first data subset to form the training image data set. Of course, all three data subsets may be combined as well into the training dataset. The third data set includes images 43-a showing a plurality of weed plants of a single weed species. The images of the third data subset are also automatically annotated with the annotations 42-3, 43-1, 43-4 of the pixels belonging to the single weed species.

The synthetic second data subset may have some issues for appropriately mimicking real plant communities growing with overlapping plant elements while the first data subset presents unbalanced classes and noisy annotations. An example of a situation with unbalanced classes is to have one class which is associated with 30% of the pixels, and another class which is associated with only 0.0001% of the pixels. Besides this, there can be pixels that are unknown which can be of any of the classes. The third data subset contains images of plants growing in a controlled environment having a single species on each plot. The plot fields were checked daily and any time a plant of another species grew, it was manually removed. Having a single species per plot implies that all the images are already labeled and hence automatic segmentation can be achieved. There were plots of three densities (number of crop plants per area): high, medium and sparse. Images were taken in two campaigns, one in Spain with 4245 images and the other one in Germany with 818 images. There were substantial differences between Spanish and German images, especially in the soil/background, though the concept is the same.

Using a leaf segmentation algorithm (e.g. the leaf segmentation algorithm described earlier), automatically generated labelled masks for each image are obtained which serve as semantic segmentation ground-truth labels. Although this segmentation method still makes a few mistakes at the pixel level the third data subset can be considered as precisely annotated.

The second and third data subsets are similar but complementary in their differences: the second data subset is more realistic in terms of plant community growing as it presents several species in the same image, whereas the third data subset presents better textures, overlapping, shadows and shapes (i.e., more information) of real field images although only one species is present.

Different training experiments were performed by including combinations of the three data subsets. All the experiments were evaluated against the validating and testing of the first data subset. In some of the experiments that more than one image training dataset was used for training. Because the data subsets had different numbers of images a generator was used to fetch images from the different data subsets in an equal manner. The generator takes one image from each data subset each time. When a data subset runs out of images (i.e. the generator retrieves the last image of the respect subset) it starts over again with the respective subset while incrementing the images in the other subset(s).

In order to avoid bias, as already mentioned each data subset was divided into 80% of the images for training, another 10% for validation and a final 10% for testing.

Data augmentation was applied every time a new image was fetched by the generator. Transformations applied for data augmentation included: rotation, height and/or width shift, zoom, vertical and/or horizontal flip, pixel-intensity shift (color change) and Gaussian blur. Shear is not recommended as the herein disclosed semantic segmentation method extracts tiles from the image and it is important to keep coherence.

The program code was implemented with the Keras Deep Learning library using TensorFlow as background. Stochastic Gradient Descent was used as optimizer for both tasks, using a learning rate of lr=0.001 with a decay=$10^{-6}$ per epoch, momentum=0.9 and Nesterov's acceleration. Balanced Accuracy (BAC) was selected as the most suitable algorithm performance metric, in order to account for the class imbalance present in the data subsets (in such cases, the use of "regular" accuracy is discouraged).

For training the DTCNN a NVIDIA Tesla V100 GPU with 16 GB of memory was used. Considering the size of the input images the batch size was set to 6. Following the same methodology described by A. Johannes et al. in "Automatic plant disease diagnosis using mobile capture devices, applied on a wheat use case," Computers and Electronics in Agriculture, vol. 138, pp. 200-209, 2017, and by A. Picon et al. in "Deep convolutional neural networks for mobile capture device-based crop disease classification in the wild," Computers and Electronics in Agriculture, 2018, the validation subset of the first data subset and the computed values of balanced accuracy (BAC) and Dice-Sorensen Coefficient were used to calculate the threshold values that maximize the validation set for the different weed species.

Various experiments were tested using the images for testing from the first data subset as they represent real field conditions. To measure influence of the use different datasets trained several models were trained combining different data subsets. Two sets of experiments were used. One set focused on validating the performance of the proposed dual task CNN based on a PSPNet topology for the segmentation module, and another set for measuring the influence on the different data subset combinations.

Two experiments focused on validating that dual task PSPNet implementation has better performance than the normal single task PSPNet (experiments are named by the used topology and the number of the used data subsets):

PSPNet $1^{st}+3^{rd}$: This experiment uses a baseline PSPNet trained with images from both the $1^{st}$ data subset and the $3^{rd}$ data subset. This combination was selected as the best data subset combination for training.

Dual task PSPNet $1^{st}+3^{rd}$: This experiments is similar to the previous one but replaces the classical PSPNet network architecture by the disclosed dual task PSPNet.

The obtained results show that the use of a dual task (classification and segmentation) CNN obtained an average Dice-Sorensen Coefficient (DSC) of 48% against the ~45% obtained when using the classical architecture. Further, balanced accuracy is improved slightly. Both models show a peak performance for images recording during the second week after sowing (mid-stage). Further, Dual task PSPNet $1^{st}+3^{rd}$ provides better scores than PSPNet, especially at early stages. Although its performance decreases faster than PSPNet as time passes. The worst DTCNN predictions (for images recorded during the fourth week after sowing) attain similar values than the classic PSPNet predictions.

The influence of the various data subsets on the performance of the dual task CNN was validated by the following experiments:

DTCNN $1^{st}$: in this experiment training was performed over the first data subset only. This dataset had several issues: a scarce number of images, high complexity, inaccurate annotation and high class unbalance.

DTCNN $2^{nd}$: In this experiment, the synthetic second data subset was used for training. A performance decrease was expected due to domain shift as the synthetic images present differences in spatial distribution, illumination, background and scales. The information about shapes and edges of the proper leaves is appropriate for training with almost perfect ground-truth annotation because the automatic annotation of the pixels ensures that each pixel is annotated with the correct class.

DTCNN $3^{rd}$: In this experiment, the single species (third) data subset is used for training. Although the plant images are obtained under real conditions, plant communities interaction cannot be obtained from this dataset.

DTCNN $1^{st}+2^{nd}$: On this experiment, images from the $1^{st}$ and $2^{nd}$ data subsets are combined for training. The second data subset allows reducing the effect of class unbalancing and bad quality annotation from the first data subset by incorporating synthetic images.

DTCNN $1^{st}+3^{rd}$: On this experiment, images $1^{st}$ and $3^{rd}$ data subsets are combined for training. The third data subset allows to reduce the effect of class unbalancing and bad quality annotation from the first data subset by including the single species images from the third data subset.

DTCNN $1^{st}+2^{nd}+3^{rd}$: the last model complements all data subsets.

To conclude, when the targeted first data subset is combined with any of the supporting datasets ($2^{nd}$, $3^{rd}$), domain shift is reduced obtaining more accurate results. The best results were obtained when using the first and third data subsets in combination for training the DTCNN.

Figure 4D:
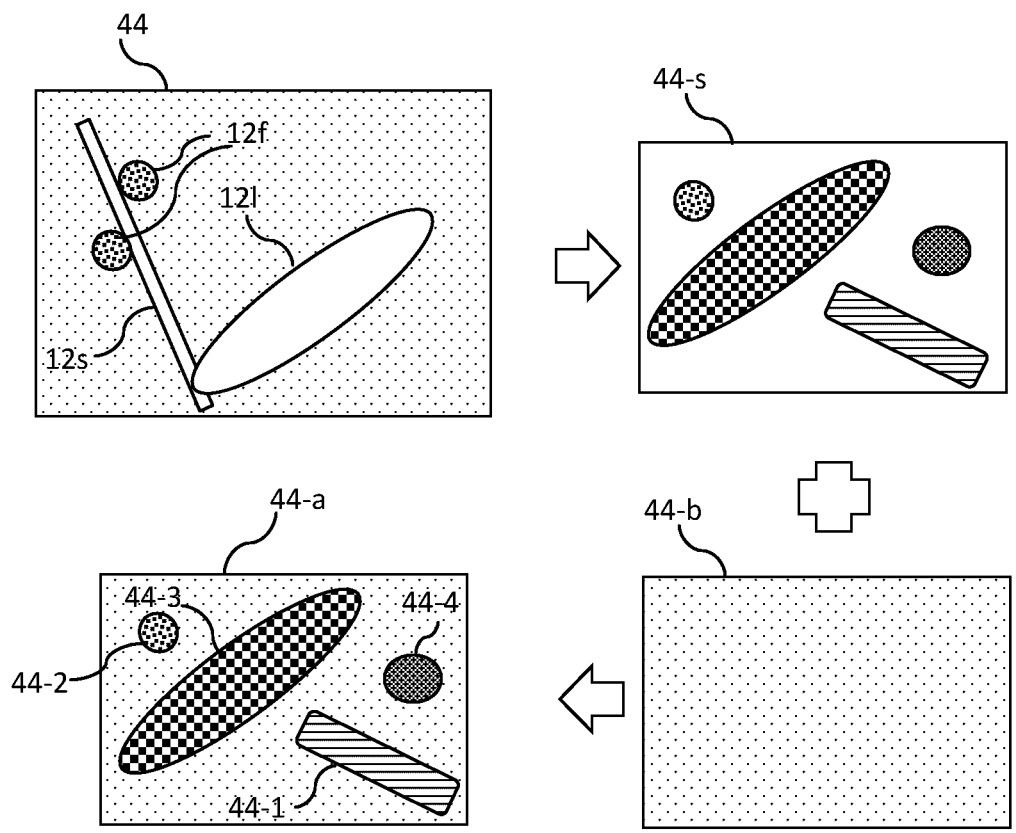
FIG. 4D illustrates a scenario where a single plant image shows further elements of a plant.

FIG. 4D illustrates a scenario where a single plant image 44 (as used for automatic annotation in FIG. 4B) shows further elements of a plant. Besides the leave 12l a stem 12s and fruits 12f of the plant are visible on this image 44. For many plants, the fruits have a color which is different from the color of the leaves of the stem. In such cases, existing segmentation methods can be used to segment pixels belonging to the fruits 12f and pixels belonging to the leaves 12l of the plant (or other elements of the plant having the same color as the leaves). Then, in a similar way as explained for FIG. 4B, not only the leaves of the plant but also its fruits can be pasted into a synthetically generated image 44-s. In combination with the background image 44-b the more realistic annotated image 44-a is generated which now also includes annotated objects 44-2 representing the fruits of plant 12* (besides the objects 44-1, 44-3 and 44-4 as known from FIG. 4B).

It is to be mentioned that a person skilled in the art can also used color differences between fruits and leaves of a plant to modify the method explained in FIG. 4C to generate automatically annotated images including objects representing leaves and fruits of the respective plants. When it comes to the annotation of other plant elements (e.g., the stem) which are of similar colors as the leaves, manual annotation of such elements may be used.

Figure 5:
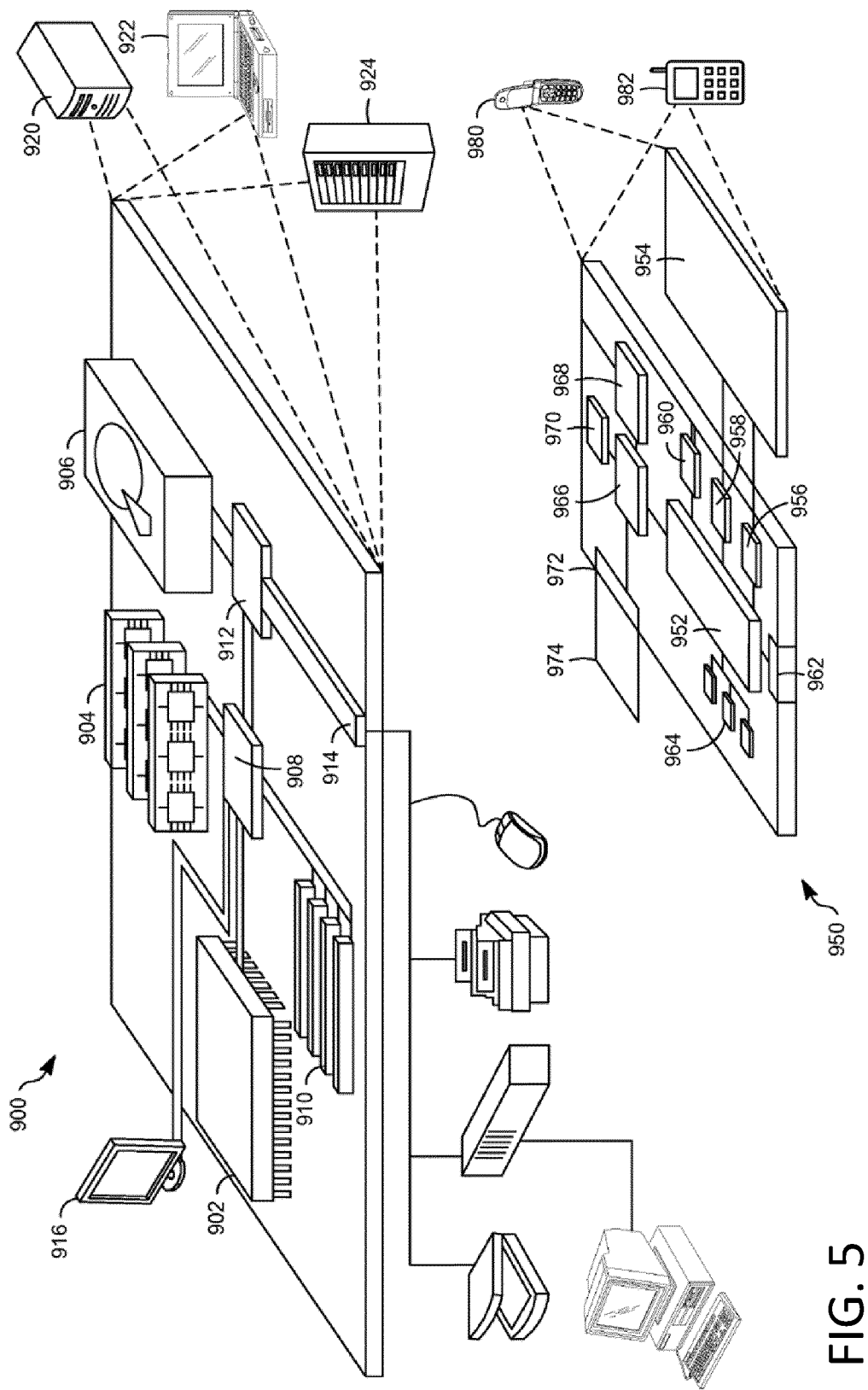
FIG. 5 is a diagram that shows an example of a generic computer device and a generic mobile computer device, which may be used with the techniques described herein.

When now using automatically annotated images which also include representations of plant fruits, the DTCNN can be trained to not only distinguish between different plant species but also to segment the image into pixels which belong to the respective fruits of a plant (e.g., crop). Normally, only one crop species is grown in an agricultural field. In such case, it is sufficient to train the DTCNN with automatically annotated images which include leaves and fruits of this crop species and the images of other plant species (weeds) as described earlier. FIG. 5 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Ideally, device 900 has a GPU adapted to process machine learning algorithms. Generic computer device 900 may correspond to the computer system 100 of FIG. 1. Computing device 950 is intended to represent various forms of mobile devices, such as personal digital assistants, cellular telephones, smart phones, and other similar computing devices. For example, computing device 950 may be used as a GUI frontend for a user to capture test input images and provide them to the computer device 900, and in turn, receive from the computer device, a segmented image indicating the location(s) of various weed plant and the respective species of the weed plants on the image. Thereby computing device 950 may also include the output device 50 of FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Furthermore, the embodiments of the present invention, especially the methods of the present invention, may be used for interacting with, operating, controlling, and/or monitoring farming machinery. As a preferred embodiment of the present invention, the methods of the present invention further comprise a step to output a signal, such as a control signal or an on-off signal, for operating, controlling, and/or monitoring farming machinery. As an advantageous embodiment of the present invention, the methods of the present invention further comprise a step to output a signal, such as a control signal or an on-off signal, for operating, controlling, and/or monitoring farming machinery, depending on the outcome of the weed identification or plant identification steps in the method of the present invention. More preferably, if a specific weed is identified, a control or on-off signal for operating farming machinery in a way targeting this specific weed is outputted, for example a control signal for operating farming machinery in order to spray or apply or in order to prepare for spraying or applying a herbicide or another crop protection agent targeting this specific weed is outputted. Advantageously, if a specific weed is identified and if a certain predefined threshold value related to this specific weed—for example regarding the weed quantity, or the weed volume quantity, or the area (e.g. hectares) or number of geographic locations where this weed has been identified—is exceeded, a control or on-off signal for operating farming machinery in a way targeting this specific weed is outputted. For example, a control signal for operating farming machinery in order to spray or apply or in order to prepare for spraying or applying an herbicide or another crop protection agent targeting this specific weed is outputted. Farming machinery may include one or more treatment mechanisms to treat plants in a field. Treatment mechanisms include chemical, mechanical, electrical treatment mechanisms or a combination of such treatment mechanisms to treat weeds, diseases or insects. The farming machinery may further include a detection and a control system. The detection system may be configured to detect in field conditions as the smart machinery moves through the field. The control system may be configured to control treatment mechanism(s) based on the detected field conditions.

In one embodiment, the treatment mechanism is a chemical treatment mechanism. The farming machinery in such embodiment includes a sprayer with one or more nozzle(s) to release chemical agent or a crop protection agent to the field.

In one embodiment, the detection system comprises one or more detection component(s) to detect field conditions as the farming machinery traverses through the field. The detection component may be an optical detection component such as a camera taking images of the field. The optical detection component may be for example the image recording device 90 (cf. FIG. 1).

In a further embodiment, the farming machinery includes one or more treatment element(s) associated with one or more detection component(s). In such embodiment the detection components may be arranged in front of the treatment element(s) when seen in drive direction. This way the detection component can sense the field condition, the system can analyze the sensed field condition and the treatment element can be controlled based on such analysis. This allows for targeted treatment based on the real-time field condition as present at the time of treatment while the farming machinery traverses in the field.

In a further embodiment, the sprayer includes multiple nozzles associated with multiple optical detection components. In such embodiment the optical detection components are arranged in front of the nozzles when seen in drive direction. Furthermore, each of the optical detection components is associated with a nozzle, such that the field of view of the optical component and the spray profile of the associated nozzle at least partly overlap as the sprayer moves through the field.

In a further embodiment, the control system is configured to analyze the sensed field condition as provided by the detection system. Based on such analysis the control system is further configured to generate control signals to actuate the treatment mechanism once the position of the treatment mechanism reached the field position that was analyzed.

Figure 6:
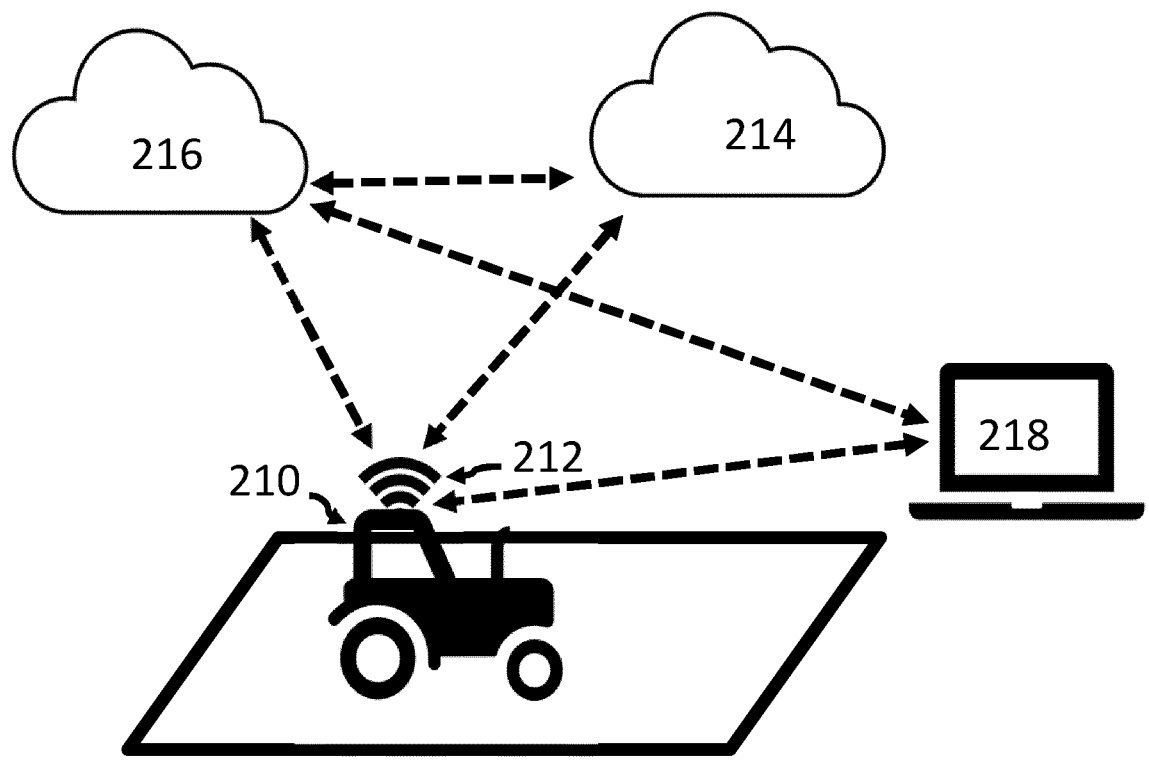
FIG. 6 illustrates smart farming machinery as part of a distributed computing environment.

FIG. 6 illustrates smart farming machinery 210 as part of a distributed computing environment.

The smart farming machinery 210 may be a smart sprayer and includes a connectivity system 212. The connectivity system 212 is configured to communicatively couple the smart farming machinery 210 to the distributed computing environment. It may be configured to provide data collected on the smart farming machinery 210 to one or more remote computing resources 212, 214, 216 of the distributed computing environment. One computing resource 212, 214, 216 may be a data management system 214 that may be configured to send data to the smart farming machinery 210 or to receive data from the smart farming machinery 210. For instance, as detected maps or as applied maps comprising data recorded during application may be sent from the smart farming machinery 10 to the data management system 214. A further computing resource 212, 214, 216 may be a field management system 216 that may be configured to provide a control protocol, an activation code or a decision logic to the smart farming machinery 210 or to receive data from the smart farming machinery 210. Such data may also be received through the data management system 214. Yet a further computing resource 212, 214, 216 may be a client computer 216 that may be configured to receive client data from the field management system 214 and/or the smart farming machinery 210. Such client data includes for instance application schedule to be conducted on certain fields with the smart farming machinery 210 or field analysis data to provide insights into the health state of certain fields.

Figure 7:
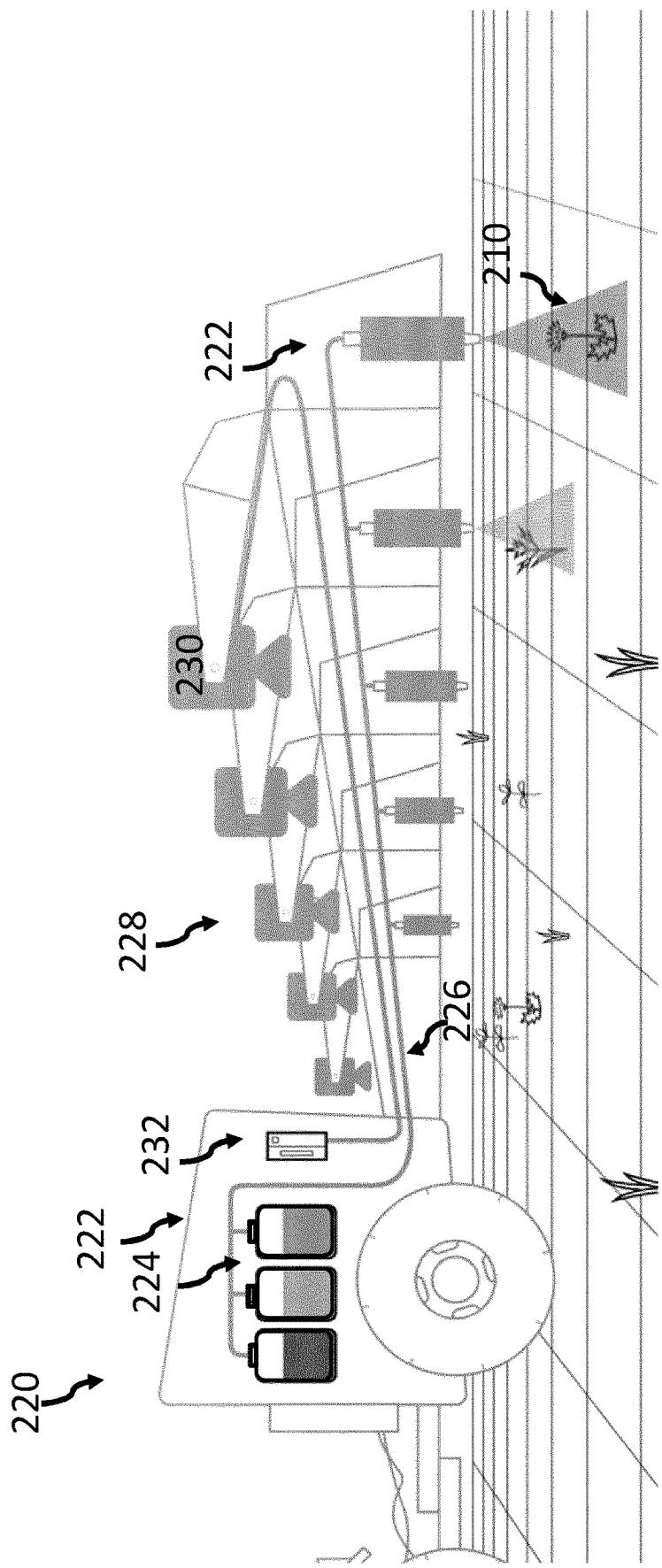
FIG. 7 illustrates an example of a smart sprayer system.

FIG. 7 illustrates an example of a smart sprayer system. The system comprises a tractor with a sprayer 220 for applying a pesticide such as an herbicide, a fungicide or an insecticide. The sprayer 220 may be releasably attached or directly mounted to the tractor. The sprayer 220 comprises a boom with multiple nozzles 222 arranged along the boom of the sprayer 220. The nozzles 222 may be arranged fixed or movable along the boom in regular or irregular intervals. Each nozzle 222 includes a controllable valve to regulate fluid release from the nozzles 222 to the field.

One or more tank(s) 24 are in fluid connection with the nozzles 222 through pipes 226. Each tank 224 holds one or more component(s) of the fluid mixture to be distributed on the field. This may include chemically active or inactive components like an herbicide mixture, components of an herbicide mixture, a selective herbicide for specific weeds, a fungicide, a fungicide mixture, a fungicide and plant growth regulator mixture, a plant growth regulator, water, oil, or the like. Each tank 224 may further comprise a controllable valve to regulate fluid release from the tank 224 to the pipes 226. Such arrangement allows to control the mixture released to the field.

Additionally, the smart sprayer system includes a detection system 228 with multiple detection components 230 arranged along the boom. The detection components 230 may be arranged fixed or movable along the boom in regular or irregular intervals. The detection components 230 are configured to sense one or more field conditions. The detection component 230 may be an optical detection component 230 providing an image of the field. Suitable optical detection components 230 are multispectral cameras, stereo cameras, IR cameras, CCD cameras, hyperspectral cameras, ultrasonic or LIDAR (light detection and ranging system) cameras. Alternatively, or additionally, the detection components 230 may include sensors to measure humidity, light, temperature, wind or any other suitable field condition.

The detection components 230 are arranged in front of the nozzles 222 (seen from drive direction). In the embodiment shown in FIG. 1, the detection components 230 are optical detection components and each detection component 230 is associated with a single nozzle 222 such that the field of view comprises or at least overlaps with the spray profile of the respective nozzle 222 on the field once the nozzle reach the respective position. In other arrangements each detection component 30 may be associated with more than one nozzle 222 or more than one detection component 30 may be associated with each nozzle 222.

The detection components 230, the tank valves and the nozzle valves are communicatively coupled to a control system 232. In the embodiment shown in FIG. 1, the control system 232 is located in the main sprayer housing and wired to the respective components. In another embodiment, detection components 230, the tank valves or the nozzle valves may be wirelessly connected to the control system 232. In yet another embodiment, more than one control system 232 may be distributed in the sprayer housing or the tractor and communicatively coupled to detection components 230, the tank valves or the nozzle valves.

The control system 232 is configured to control and/or monitor the detection components, the tank valves or the nozzle valves following a control protocol. In this respect the control system 232 may comprise multiple modules. One module for instance controls the detection components to collect data such as an image of the field. A further module analyses the collected data such as the image to derive parameters for the tank or nozzle valve control. Yet further module(s) control(s) the tank and/or nozzle valves based on such derived parameters.

Figure 8:
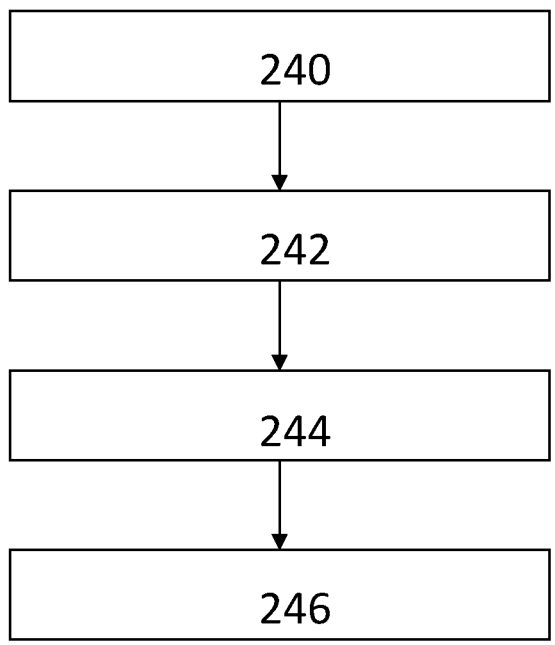
FIG. 8 illustrates a control protocol for the smart sprayer system to control weeds, diseases or insects via a chemical control mechanism.

FIG. 8 illustrates the control protocol for the smart sprayer system to control weeds, diseases or insects via a chemical control mechanism.

The control protocol of the smart sprayer system may be triggered once the smart sprayer activates application operation on the field. In a first step 240, the optical detection components are triggered to provide data such as an image of the field. In a second step 242, the provided data such as the images provided by each optical detection components are analyzed with respect to weeds, diseases or insects depending on the target of the chemical control mechanism. In the context of the present invention, such images are analyzed using the method of the present invention. In a third step 244, parameters are derived from such analysis to derive and/or output control signals for the tank and nozzle valves. For example, if specific weeds are identified using the method of the present invention, control signals for the tank and nozzle valves in order to spray or apply or to prepare for spraying or applying specific herbicides or crop protection agents targeting the identified weeds are derived and/or outputted. In a fourth step 246, such control signals are provided to the respective tank and/or nozzle valves.

Owing to the system set up each tank and nozzle valve can be controlled individually. Hence, if only one image shows the presence of a weed only the respective nozzle associated with that optical detection component having the spray profile covering the field of view of that optical detection component will be triggered. Similarly, if multiple images show the presence of a weed—after an image analysis using the method of the present invention has been conducted—the respective nozzles associated with those optical detection components having the spray profile covering the fields of view of those optical detection components will be triggered.

In addition to such targeted treatment, the control of tank valves allows to adjust the treatment composition in dependence on the conditions sensed by the optical detection components in the field. For instance, first tank may include a first herbicide comprising a first active ingredients composition and a second tank may include a second herbicide comprising a second active ingredients composition. Depending on the outcome of the image analysis using the method of the present invention, the valve of the first or the second or both tanks may be triggered to provide respective herbicides for application on the field.

In another advantageous embodiment, a variable rate application (VRA) map for applying crop protection agents may be generated on the basis of the image analysis using the methods of the present invention, wherein the to-be-analyzed images are obtained, for example, through image recording device 90 which may be mounted on an agricultural machine, an unmanned aerial vehicle (e.g. a drone), or any movable equipment. This variable rate application (VRA) map may be used later by another agricultural machine, unmanned aerial vehicle, movable equipment for applying herbicides or crop protection agents.

In another advantageous embodiment, the image analysis using the methods of the present invention can also be used for monitoring the application of herbicides or crop protection agents—for example in terms of effectiveness, timeliness and completeness of this application—after this application has been conducted, for example, 1 day, 2 days, 3 days, 4 days, 5 days, 6 days, 7 days, 10 days, 2 weeks, 3 weeks, 4 weeks after this application has been conducted. Depending on the outcome of this image analysis, especially of the weed identification or plant identification steps in the method of the present invention, a signal, such as a control signal or an on-off signal, for operating, controlling, and/or monitoring farming machinery, may be outputted.

The invention claimed is:

1. A computer-implemented method (1000) for identifying weeds in a crop field using a dual task convolutional neural network (120) having a topology with:
an intermediate module (121) configured for executing a first task in determining weed species (11, 12, 13) which are present on a test input image (91), the first task being associated with a first loss function (LF1), and
a semantic segmentation module (122) configured for executing a second task in segmenting the test input image (91) to determine a class for each pixel of the test input image (91), the classes comprising the determined weed species, the second task associated with a second different loss function (LF2),
wherein the intermediate module and the segmentation module being trained together, taking into account the first and second loss functions (LF1, LF2);
the method comprising:
receiving (1100) a test input (91) comprising an image showing crop plants of a crop species in an agricultural field and showing weed plants of one or more weed species among said crop plants;
extracting (1200) tiles from the test input image, the tiles having the dimensions of the input shape of the intermediate module;
for each extracted tile:
the intermediate module (121) predicting (1300) the presence of one or more weed species which are present in the respective tile;
the intermediate module (121) outputting (1400) a corresponding intermediate feature map (121-o1) to the segmentation module (122) as output of the first task; and
the segmentation module generating (1700) a mask for each weed species class as segmentation output of the second task by extracting (1500) multiscale features and context information from the intermediate feature map and concatenating (1600) the extracted information to perform semantic segmentation, the mask being an image having the same size as a tile where each pixel on the mask is associated with a value representing the probability for said pixel to belong to the associated class; and
combining (1800) the generated masks into a final image indicating for each pixel if it belongs to a particular weed species, and if so, to which weed species it belongs.

2. The method of claim 1, wherein the intermediate module is implemented by a classification neural network.

3. The method of claim 1, wherein the first loss function (FL1) is "weighted binary cross-entropy" where each sample pixel is weighted depending on the class it belongs to, the intermediate module (121) using "sigmoid" as last activation layer to support the presence of multiple classes simultaneously.

4. The method of claim 1, wherein the intermediate module is implemented by a regression neural network.

5. The method of claim 4, wherein the first loss function (FL1) is "mean squared error" or "mean average error", the intermediate module (121) using "linear" or "sigmoid" as last activation layer to support the detection of a presence of multiple classes simultaneously.

6. The method of claim 1, wherein the second loss function (FL2) associated with the segmentation module is "weighted categorical cross-entropy".

7. The method of claim 1, wherein an image training data set used for training the intermediate module together with the segmentation module comprises:
a first data subset with images (41-a) showing real world situations in an agricultural field with crop plants of a crop species (10) and weed plants of one or more weed species (11, 12, 13) amongst the crop plants, the first data subset with manual pixel annotations (41-1, 41-2, 41-3) indicating the species to which the pixels of the training images belong; and
at least one of:
a second data subset with images (42-a) showing a plurality of weed plants of different weed species obtained from single plant images with each single plant image showing a plant of a single species, and the single plants pasted into a soil background image, the second data subset with automatic annotations (42-1, 42-3, 42-4) of the pixels belonging to the single weed species; or
a third data subset with images (43-a) showing a plurality of weed plants of a single weed species, the third data subset with automatic annotations (42-3, 43-1, 43-4) of the pixels belonging to the single weed species.

8. The method of claim 1, further comprising:
if a particular weed is identified, outputting a signal for operating, controlling and/or monitoring farming machinery wherein the signal is configured to trigger spraying or applying a herbicide or another crop protection agent targeting the particular weed.

9. The method of claim 1, wherein the segmentation module (122) is implemented by a pyramid pooling module, and wherein the pyramid pooling module is based on a PSPNet topology.

10. The method of claim 9, wherein the pyramid pooling module comprises four separate filters (122-2) with different receptive fields which scan the intermediate feature map (121o1) and create four arrays for multi-scale feature detection to integrate information of different scales and sizes.

11. The method of claim 10, wherein the pyramid pooling module further comprises a plurality of up-sampling layers configured to restore the image size of each array to the size of the intermediate feature map (121o1) using bilinear interpolation.

12. The method of claim 11, wherein the pyramid pooling module further comprises convolutional layers (122-4) configured to extract contextual information from the four separate filters and concatenate the contextual information with the information of different scales and sizes to generate a final feature map (122-4o) of the same size as the intermediate feature map (121-o1).

13. The method of claim 12, wherein the pyramid pooling module further comprises fully-connected layers (122-5) to compute final pixel-wise predictions as the generated masks with a last activation layer "softmax".

14. A computer system for identifying weeds in a crop field, the computer system comprising a memory and at least one processor and further comprising software modules that, when executed by the at least one processor, cause the computer system to perform the steps of the computer-implemented method according to claim 1.

15. A non-transitory computer-readable medium having instructions encoded thereon that, when loaded into a memory of a computing device and executed by at least one processor of the computing device, cause the at least one processor to execute the steps of the computer-implemented method according to claim 1.

16. A computer-implemented method (1000) for identifying plant species in an agricultural field using a dual task convolutional neural network (120) having a topology with:
an intermediate module (121) configured for executing a first task in determining plant species (11, 12, 13) which are present on a test input image (91), the first task being associated with a first loss function (LF1), and
a semantic segmentation module (122) configured for executing a second task in segmenting the test input image (91) to determine a class for each pixel of the test input image (91), the classes comprising the determined plant species, the second task associated with a second different loss function (LF2),
wherein the intermediate module and the segmentation module being trained together, taking into account the first and second loss functions (LF1, LF2);
the method comprising:
receiving (1100) a test input (91) comprising an image showing plants of a plurality of plant species in an agricultural field;
extracting (1200) tiles from the test input image, the tiles having the dimensions of the input shape of the intermediate module;
for each extracted tile:
the intermediate module (121) predicting (1300) the presence of one or more plant species which are present in the respective tile;
the intermediate module (121) outputting (1400) a corresponding intermediate feature map (121-*o*1) to the segmentation module (122) as output of the first task; and
the segmentation module generating (1700) a mask for each plant species class as segmentation output of the second task by extracting (1500) multiscale features and context information from the intermediate feature map and concatenating (1600) the extracted information to perform semantic segmentation, the mask being an image having the same size as a tile where each pixel on the mask is associated with a value representing the probability for said pixel to belong to the associated class; and
combining (1800) the generated masks into a final image indicating for each pixel if it belongs to a particular plant species, and if so, to which plant species it belongs.

17. The method of claim 16, further comprising:
if a particular weed is identified, outputting a signal for operating, controlling and/or monitoring farming machinery wherein the signal is configured to trigger spraying or applying a herbicide or another crop protection agent targeting the particular weed.

18. A computer-implemented method for identifying plant species and plant fruits in an agricultural field using a dual task convolutional neural network (120) having a topology with:
an intermediate module (121) configured for executing a first task in determining plant species (11, 12, 13) and plant fruits (12*f*) of respective plant species (12) which are present on a test input image (91), the first task being associated with a first loss function (LF1), and
a semantic segmentation module (122) configured for executing a second task in segmenting the test input image (91) to determine a class for each pixel of the test input image (91), the classes comprising the determined plant species and plant fruits, the second task associated with a second different loss function (LF2),
wherein the intermediate module and the segmentation module being trained together, taking into account the first and second loss functions (LF1, LF2);
the method comprising:
receiving a test input (91) comprising an image showing plants of a plurality of plant species in an agricultural field with at least one plant carrying plant fruits;
extracting tiles from the test input image, the tiles having the dimensions of the input shape of the intermediate module;
for each extracted tile:
the intermediate module (121) predicting the presence of one or more plant species and plant fruits of respective plant species which are present in the respective tile;
the intermediate module (121) outputting (1400) a corresponding intermediate feature map (121-*o*1) to the segmentation module (122) as output of the first task; and
the segmentation module generating a mask for each plant species class and plant fruit class as segmentation output of the second task by extracting multiscale features and context information from the intermediate feature map and concatenating the extracted information to perform semantic segmentation, the mask being an image having the same size as a tile where each pixel on the mask is associated with a value representing the probability for said pixel to belong to the associated class; and
combining the generated masks into a final image indicating for each pixel if it belongs to a particular plant species or a particular plant fruit class, and if so, to which plant species or plant fruit class it belongs.

19. The method of claim 18, further comprising:
if a particular weed is identified, outputting a signal for operating, controlling and/or monitoring farming machinery wherein the signal is configured to trigger spraying or applying a herbicide or another crop protection agent targeting the particular weed.

20. The method of claim 18, further comprising:
determining the number of pixels belonging to a particular plant fruit class associated with a crop grown in the agricultural field; and
estimating the ratio of the number of pixels belonging to the particular plant fruit class and the number of pixels belonging to the corresponding crop plant species.

* * * * *